(12) United States Patent
Guidetti et al.

(10) Patent No.: US 12,049,338 B2
(45) Date of Patent: Jul. 30, 2024

(54) METHOD FOR A PACKAGING MATERIAL

(71) Applicant: Tetra Laval Holdings & Finance S.A., Pully (CH)

(72) Inventors: Gloria Guidetti, Bologna (IT); Gabriele Borelli, Spilamberto (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 252 days.

(21) Appl. No.: 17/596,812

(22) PCT Filed: Jun. 11, 2020

(86) PCT No.: PCT/EP2020/066199
§ 371 (c)(1),
(2) Date: Dec. 17, 2021

(87) PCT Pub. No.: WO2020/254185
PCT Pub. Date: Dec. 24, 2020

(65) Prior Publication Data
US 2022/0161957 A1    May 26, 2022

(30) Foreign Application Priority Data

Jun. 20, 2019  (EP) .................... 19181464

(51) Int. Cl.
 *B31D 1/02*    (2006.01)
 *B65B 9/20*    (2012.01)
 (Continued)

(52) U.S. Cl.
 CPC ............ *B65B 61/025* (2013.01); *B31D 1/028* (2013.01); *B65B 9/20* (2013.01); *B65D 75/26* (2013.01);
 (Continued)

(58) Field of Classification Search
 CPC ......... B65B 9/20; B65B 61/025; B65D 65/40; B65D 75/26; B65D 85/72; B65D 2203/10;
 (Continued)

(56) References Cited

U.S. PATENT DOCUMENTS 7,492,164 B2 *   2/2009   Hanhikorpi et al. ....................... G06K 19/0723
                                                                    324/633
7,653,982 B2 *   2/2010   Chopra et al. ... G06K 19/07784
                                                                    29/601
(Continued)

FOREIGN PATENT DOCUMENTS

CN    103965697 A   *   8/2014
CN    108764429 A   *   11/2018    ....... G06K 19/07749
(Continued)

OTHER PUBLICATIONS

English language translation of WO 2015099378 A1 Description, espacenet.com, 31 pages, retrieved Nov. 21, 2023. (Year: 2023).*

(Continued)

*Primary Examiner* — Stephen F. Gerrity
(74) *Attorney, Agent, or Firm* — Knobbe, Martens, Olson & Bear, LLP (57) ABSTRACT

A method for providing a packaging material is provided. The method comprises feeding a web of packaging material through a packaging material processing unit; determining a target position of the packaging material; and controlling a printing unit to print an RFID antenna at the target position, wherein the material used for printing the RFID antenna is conductive substance. A packaging material is also provided.

18 Claims, 5 Drawing Sheets

(51) Int. Cl.
*B65B 61/02* (2006.01)
*B65D 75/26* (2006.01)
*B65D 85/72* (2006.01)
*G06K 19/077* (2006.01)

(52) U.S. Cl.
CPC ....... *B65D 85/72* (2013.01); *G06K 19/07749* (2013.01); *G06K 19/07773* (2013.01); *B65D 2203/10* (2013.01)

(58) Field of Classification Search
CPC ............. B31D 1/028; G06K 19/07749; G06K 19/07773
See application file for complete search history.

(56) References Cited

U.S. PATENT DOCUMENTS

| | | | | |
|---|---|---|---|---|
| 2002/0030597 | A1* | 3/2002 | Muirhead | B65D 19/0018 340/572.1 |
| 2004/0175515 | A1* | 9/2004 | Lawrence et al. | G06K 19/07749 428/32.1 |
| 2009/0017578 | A1* | 1/2009 | Walther et al. | G06K 19/07749 29/601 |
| 2009/0095818 | A1* | 4/2009 | Smith et al. | G06K 19/07749 29/829 |
| 2011/0132975 | A1 | 6/2011 | Toft et al. | |
| 2018/0312404 | A1 | 11/2018 | Karagiannidis et al. | |
| 2020/0002560 | A1* | 1/2020 | Lai | C09D 11/037 |
| 2020/0097785 | A1* | 3/2020 | Kato et al. | B65D 65/40 |

FOREIGN PATENT DOCUMENTS

| | | | | |
|---|---|---|---|---|
| EP | 1837811 A1 * | 9/2007 | ....... | G06K 19/07749 |
| JP | S63-180560 U | 11/1988 | | |
| JP | 2011-525863 A | 9/2011 | | |
| JP | 2019-502620 A | 1/2019 | | |
| WO | WO 2009/112255 | 9/2009 | | |
| WO | WO 2015/099378 | 7/2015 | | |
| WO | WO 2018/073568 | 4/2018 | | |
| WO | WO 2018/216686 A1 | 11/2018 | | |

OTHER PUBLICATIONS

International Search Report and Written Opinion of PCT/EP2020/066199, Dated Aug. 13, 2020, in 9 pages.

* cited by examiner

METHOD FOR A PACKAGING MATERIAL

TECHNICAL FIELD

The invention relates to a packaging material, in particular to a packaging laminate used for forming individual packaging containers intended to enclose a liquid food content. More specifically, the invention relates to such packaging material and a method for providing a packaging material with a RFID tag.

BACKGROUND ART

Packaging material is used in various industries. One type of packaging material being particularly suitable for forming liquid food packaging containers is provided as a laminate comprising a bulk layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a packaging container produced from the laminate, there is an innermost layer, applied onto the aluminium foil, which innermost, inside layer may be composed of one or several part layers, comprising heat sealable thermoplastic polymers, such as adhesive polymers and/or polyolefins. Also, on the outside of the bulk layer, there is an outermost heat sealable polymer layer.

The packaging containers are generally produced by means of modern, high-speed packaging machines of the type that form, fill and seal packages or containers from a web or from prefabricated blanks of the packaging material. Packaging containers may thus be produced by reforming a web of the laminated packaging material into a tube by both the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic or cuboid, by fold formation along prepared crease lines in the packaging material.

An advantage of this continuous tube-forming, filling and sealing packaging method concept is the possibility of continuous high-speed packaging, which has considerable impact on cost efficiency.

Typically, many thousands of packages may be prepared per hour. For example, the Tetra Pak® A3/speed may manufacture about 15 000 packages per hour (family-size packaging containers of 0.9 liters and above), and about 24 000 packaging containers per hour (portion packages). Packaging containers for sensitive liquid food, for example milk or juice, can also be produced from sheet-like blanks or prefabricated blanks of the laminated packaging material. From a tubular blank of the flat-folded packaging laminate, packages are produced by initial erection of the blank to form an open tubular container capsule, of which one open end is closed off by means of folding and heat-sealing of integral end panels. The thereby closed container capsule is filled with the food product in question, e.g. juice, through its open end, which is thereafter closed off by means of further folding and heat-sealing of corresponding integral end panels. An example of a packaging container produced from sheet-like and tubular blanks is the conventional so-called gable-top package. There are also packages of this type which have a moulded top and/or screw cap made of plastic.

The known packaging laminate is conventionally produced by means of a converting process, from a web of paper or paperboard. One or more bonding layers of a laminating material, usually low-density polyethylene (LDPE), may be applied to permanently bind an aluminium foil web to the paper or paperboard web, if such barrier film is required. The paper or paperboard web is provided on both sides with liquid-tight coatings of polyethylene, normally low-density polyethylene (LDPE), and is then wound up on finished packaging reels for onward transport and handling to the packaging machines. Also, this converting process is running extremely fast, such as up to 400 m/min.

It has been suggested to provide the packaging material with printed images representing some kind of information which may be later read and used for traceability or authentication. These can be printed to the packaging material, or rather to one of the layers of the packaging material, either during the converting process or as the packaging material is being transported through the packaging machine. Examples of printed images are bar codes and 2D codes, such as QR codes.

The prior art successfully allows unique information to be added to different segments of the packaging material, in particular when a specific segment of the packaging material is used to form a single packaging container. However, these images must be visible for proper reading, which requires specific inks and a certain contrast relative the décor of the packaging material. Another approach to providing a packaging material with unique information is to make use of magnetic marking, whereby magnetic field marks can hold complex data. Such complex data may e.g. include a unique code from which the web, and also the part of the web, can be identified. The complex data can also give position information, indications for the finishing of the packaging container, etc.

Despite the solutions described above, there is still a need for improved methods for allowing a unique identifier to be assigned to each packaging container, as well as enabling the resulting packaging container to communicate with external devices. Especially, there is a need for improvements with regards to unique identifiers, providing advantages in shelf management, logistics optimization, and improved connected recyclability chain.

SUMMARY

It is an object of the invention to at least partly overcome one or more of the above-identified limitations of the prior art. In particular, it is an object to provide a method for producing a packaging material, wherein RFID tags are printed to the packaging material in-line, i.e. during transport of the packaging material through the converting process or through a packaging machine.

According to a first aspect, a method for providing a packaging material is provided. The method comprises feeding a web of packaging material through a packaging material processing unit; determining a target position of said packaging material; and controlling a printing unit to print an RFID antenna at said target position. The material used for printing the RFID antenna is a conductive substance, in particular a carbon-based substance, even more particularly a graphene-based substance.

The use of a graphene-based material provides a number of advantages. First, the RFID antenna may be printed as extremely thin, which allows for a compatibility with the high-speed operation of packaging material processing units of today. Secondly, the material might not contain metallic particles that are less compliant with food-safety regulations. Thirdly, it has proven to use standard printing units, such as ink jet units, to print the RFID antenna on the running web of packaging material.

The graphene-based conductive substance may be an ink, which further allows to use of standard ink-applying techniques.

The graphene-based conductive substance may comprise graphene or graphene oxide, in one or more layers. Preferably, the disposition of the graphene material is in the range of 1-20 layers.

The graphene-based conductive substance may comprise a dispersion of flakes of graphene or graphene oxide, which provides for facilitated handling and application of the RFID antenna.

The packaging material processing unit may be a packaging material converting unit or a packaging machine configured to form, fill, and seal package containers. The method is thereby very versatile, as the RFID antenna can be printed to the packaging material either as the packaging material is produced, or during production of the package containers.

The step of controlling the printing unit to print the RFID antenna at said target position may further comprise printing one or more resonance circuits adjacent to said antenna. By doing so, it is possible to use the RFID antenna without a RFID chip as the resonance circuits can be tuned to unique frequencies.

The method may further comprise coating said one or more resonance circuits with a substance, which substance is configured to change the resonance frequency of the resonance circuit. Hence, such resonance circuit can be made sensitive to ambient conditions and it can be tailored to provide information if such ambient conditions are changed.

The method may further comprise attaching a RFID chip to said antenna. Improved functionality of the RFID tag is thereby accomplished.

The target position of the RFID antenna may be determined in relation to one or more features of the packaging material. Exact positioning of the RFID antenna is thereby accomplished, which can be used for machine register, or other machine operations requiring specific positioning.

The packaging material may comprise a plurality of layers together forming a laminate configured to store liquid food content when the packaging material is formed into a package container, and the RFID antenna may be printed on one of said layers. Hence, the RFID antenna may not necessarily be printed on the external (and thereby visible) layer of the packaging material, but it can be embedded in the laminate for improving protection of the RFID antenna.

According to a second aspect, a packaging material comprising a plurality of layers together forming a laminate configured to store liquid food content when the packaging material is formed into a package container, is provided. The packaging material comprises at least one RFID antenna being printed when a web of said packaging material is fed through a packaging material processing unit, and wherein the RFID antenna is formed by a graphene-based conductive substance.

The target position of the RFID antenna may be fixed in relation to one or more features of the packaging material.

The packaging material may further comprise at least one resonance circuit position adjacent to said RFID antenna, wherein the resonance frequency is formed by the graphene-based conductive substance.

The packaging material may further comprise a RFID chip being attached to said RFID antenna.

According to a third aspect, a package is provided. The package is formed by a packaging material according to the second aspect.

Furthermore, this RFID tag might be recyclable together with the package.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figure 1:
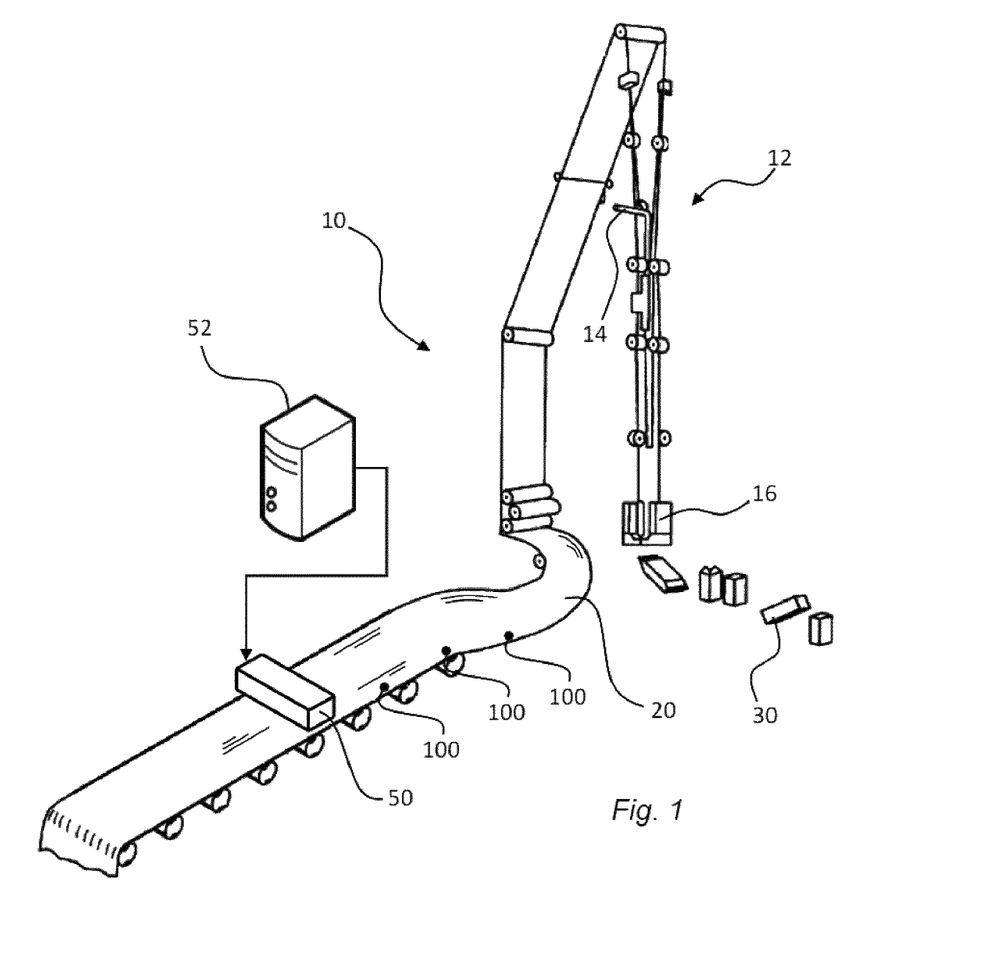
FIG. 1 is a schematic view of a packaging machine.

With reference to FIG. 1 a packaging machine 10 configured to form, fill, and seal package containers is illustrated. The packaging machine 10 typically includes a number of consecutive stations for transforming a planar web 20 of packaging material to a closed package 30.

The web-shaped packaging material 20 is loaded into the packaging and filling machine 10. The unwound packaging material 20 is transported continually through various stations in order to prepare the packaging material for forming, filling, and sealing. Such stations may e.g. include longitudinal strip applicators, and sterilizing units (not shown).

For filling, the packaging material 20 is transformed into a tube and carried into an aseptic chamber 12 assuring that liquid food is filled up the tube-like packaging material with the aseptic atmosphere. The packaging material 20 is transformed gradually with e.g. forming rings to be formed to the tube-like shape.

The tube-like packaging material 20 is sealed longitudinally, and the liquid food is filled up into the tube-like packaging material 20 by means of a filling pipe 14. Finally, a transversal sealing unit 16 provides closing of the tube-like packaging material such that a closed upper end is formed simultaneously as a closed bottom end of the tube-like packaging material 20. The sealing unit 16 also performs a transversal cutting in order to separate the finished package 30 from the tube-like packaging material 20. The cut-off package 30 may be further fold-formed and sealed to acquire its final shape, such as a cuboid shape.

The packaging machine 10 is also provided with a printing unit 50, arranged close to the web of packaging material 20 as the packaging material 20 is transported through the packaging machine 10. Preferably, the printing unit 50 is arranged at a position where the web of packaging material 20 is flat, i.e. prior to the tube forming.

The printing unit 50 is connected to a control unit 52, such that the printing unit 50 is configured to print RFID antennas 100 at different positions as the web of packaging material 20 is running through the packaging machine 10. The RFID antennas 100 are preferably printed using a graphene based conductive substance.

However, other conductive substances could also be used; in particular, conductive inks could be used to print the RFID antennas. The conductive ink may be carbon-based, (e.g. graphene or carbon nanotubes), metal nano-particle based (e.g. AG, AI), or organic (e.g. Plexcore OC AQ-1250 by Sigma Aldrich). Although metal nanoparticle-based inks are easy to use and commercially available, carbon-based substances may still be preferred due to compatibility with liquid food packaging.

The printing unit 50 is shown as an elongated body, extending across the width of the packaging material 20. It should however be understood that the printing unit 50 could be realized in many different shapes and sizes, as long as it is capable of printing the RFID antenna 100 to the packaging material 20.

The printing unit 50 is in this embodiment arranged to print the RFID antenna 100 at the outside surface of the packaging material 20; depending on the substance used for printing, the printing unit 50 could also be arranged to print the RFID antenna 100 on the inside surface of the packaging material 20.

The RFID antennas 100 are positioned at fixed, or predetermined positions of the packaging material 20. As will be explained later with reference to FIG. 4, the packaging material 20 is provided with features, such as crease lines, which allow the printing unit 50 and the associated control unit 52 to accurately position the printed RFID antenna 100 at its desired position relative these features, such that the RFID antenna 100 is positioned correctly also on the final package 30. This is also the case if an RFID chip is to applied by means of a chip applicator, wherein the control unit 52 (or any other control unit being configured to control the operation of the chip applicator) is configured to accurately control the position of the RFID chip relative the RFID antenna.

Hence, the RFID antennas 100 could be applied to the packaging material 20 as the packaging material 20 is transported through the packaging machine 10.

Figure 2:
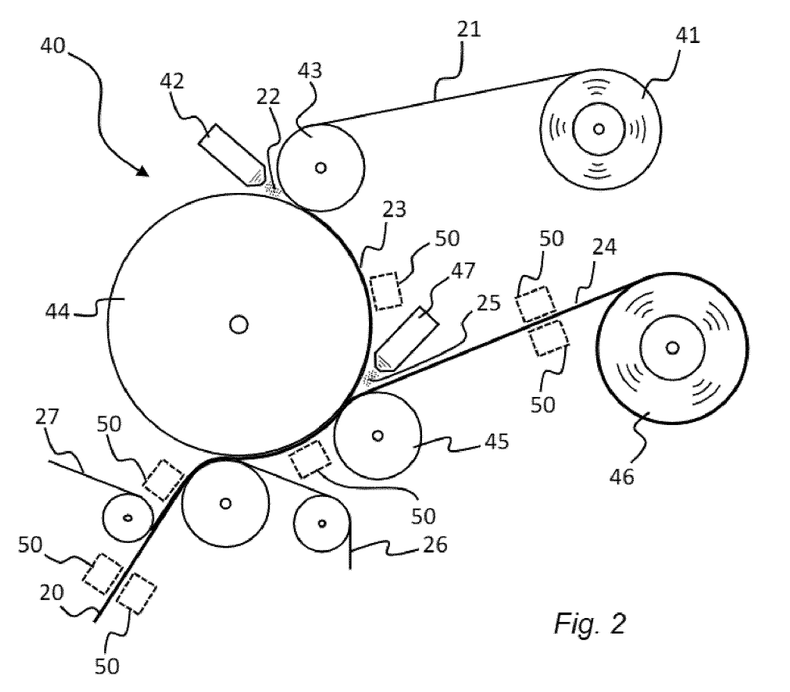
FIG. 2 is a schematic view of a converting unit.

Another embodiment is shown in FIG. 2, where the RFID antennas 100 are printed to the packaging material 20 already during manufacturing of the packaging material 20, i.e. prior to the packaging material 20 being fed to the packaging machine 10.

In FIG. 2 an example of a packaging material converting unit 40 is shown. Although the packaging material converting unit 40 is based on the concept of pre-laminating an aluminum foil web 21, being supplied from a magazine reel 41, to a thermoplastic material 22 being supplied from an extruder 42, it should be noted that the embodiments presented herein may be particular suitable also for chilled product packaging material having no aluminum foil. Hence, the example of FIG. 2 should only be seen as one option. In fact less complex and metal free packaging material may be even more preferred for the technical solutions described herein.

Production of the packaging material 20 proceeds such that the aluminum foil web 21 is paid out from the magazine reel 41 and led over a nip roller 43 in contact with a cooling roller 44 which is in contact with and synchronously rotating with the nip roller 43, as well as a further nip roller 45 arranged downstream. At the same time, a continuous film 22 of molten or semi-molten thermoplastic material, for example polyethylene, is forced out by means of the extruder 42, this plastic film being directed into the so-called nip, i.e. the point of contact between the nip roller 43 and the cooling roller 44. The molten or semi-molten thermoplastic film 22 will, in such instance, be accommodated between the aluminum foil web 21 and the surface of the cooling roller 44, thereby forming a plastic-aluminum foil laminate 23.

From another magazine reel 46, a core layer web 24 of paper or board is paid out and led over the nip roller 45 into contact with the cooling roller 44. With the aid of a second extruder 47, a continuous plastic film 25 is extruded in between the second nip roller 45 and the cooling roller 44, in which event the expelled plastic film 25 of polyethylene will be accommodated between the aluminum foil side of the formed plastic-aluminum foil laminate 23 and the core layer 24. By compression between the second nip roller 45 and the cooling roller 44, the core layer 24 and the laminate 23 are united to form a composite packaging material laminate 20. In addition to the above-mentioned converting processes, an outside layer 26 of plastic material and in inside layer 27 of plastic material may also be added in order to form the packaging material 20.

The printing unit 50, as described with reference to FIG. 1, could be arranged at various locations in the packaging material converting unit 40. Several printing units 50 are therefore indicated in FIG. 2, although it should be understood that it may be necessary with only one printing unit 50, at a single location.

For example, the printing unit 50 may be arranged so that the RFID antenna 100 is printed on the outer side of the core layer 24 before lamination, or on the inner side of the core layer 24 before lamination. Other possible positions of the printing unit 50 are illustrated in FIG. 2.

Figure 3:
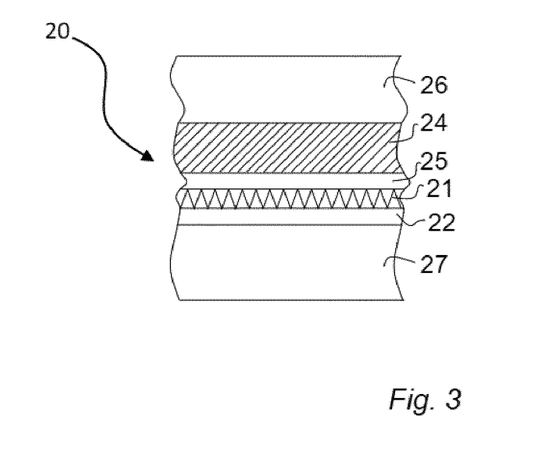
FIG. 3 is a cross-sectional view of a packaging material.

An example of a resulting packaging material 20 is shown in FIG. 3, in cross-section. The RFID antenna 100 could, depending on the location of the printing unit 50 during the converting process, be arranged at any of the interfaces between the different material layers; on the external side of layer 27, between layers 27 and 22, between layers 22 and 21, between layers 21 and 25, between layers 25 and 24, between layers 24 and 26, or on the external side of layer 26.

Figure 4:
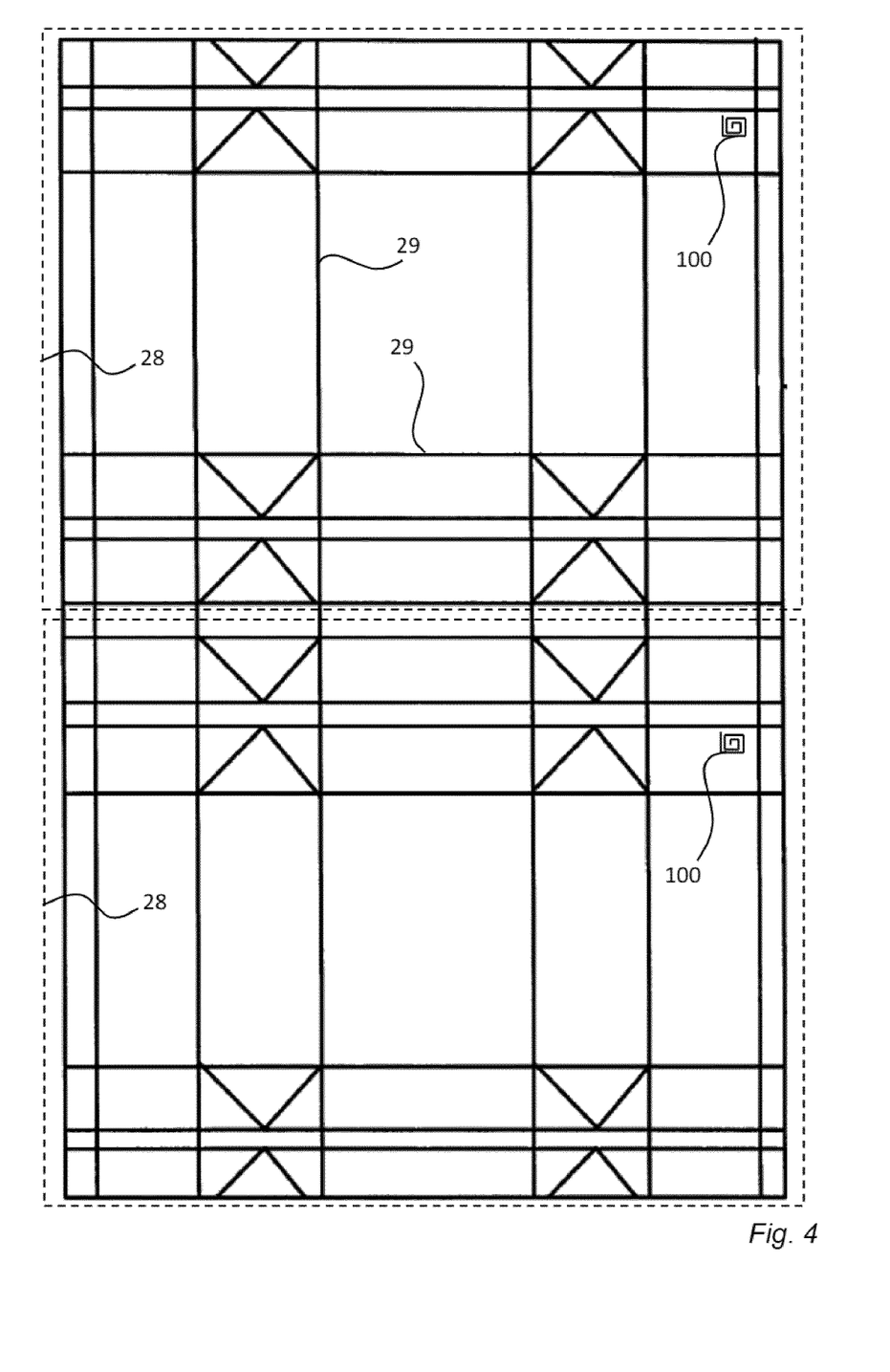
FIG. 4 is a planar view of a packaging material.

Now turning to FIG. 4, an example of a packaging material 20 is shown. The packaging material 20 is provide in the form of a continuous web, e.g. to be used by a packaging machine 10 as shown in FIG. 1. The web thereby includes a series of segments 28, each segment 28 being later used to form an individual package 30. In FIG. 4, two segments 28 are shown. Each segment 28 has a plurality of crease lines 29, and each segment 28 is also provided with an RFID antenna 100, being printed by means of a printing unit 50.

Hence, the packaging material 20 of FIG. 4 could be taken from a position downstream the printing unit 50 of FIG. 1, or after finished manufacture by the packaging material converting unit 40 of FIG. 2.

Figure 5:
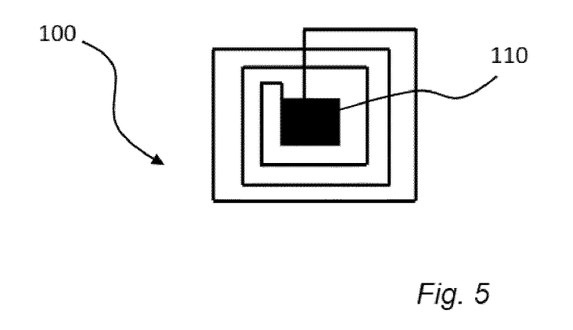
FIGS. 5 and 6 are top views of RFID antennas.
Figure 6:
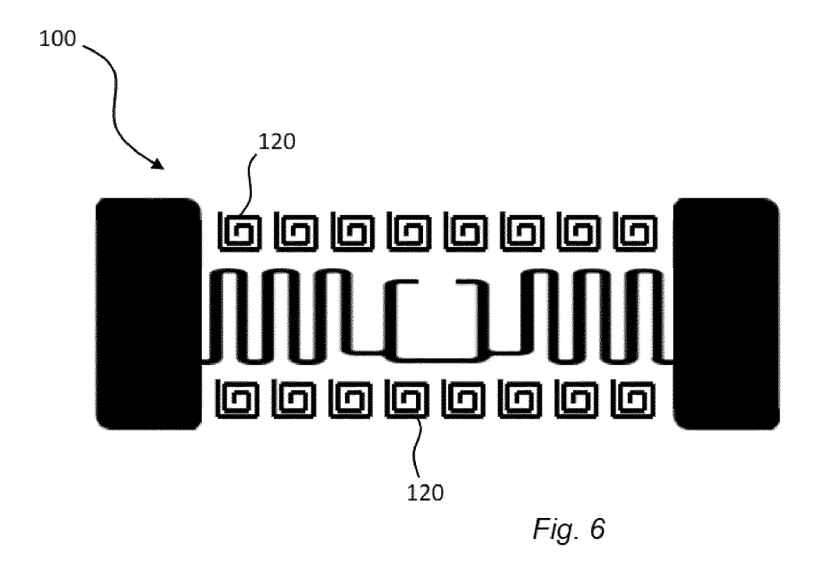

In FIG. 5 an example of a graphene based RFID antenna 100 is shown. Except for the antenna 100, a RFID chip 110 is mounted to the antenna 100. The RFID chip 110 can be mounted at any time after the RFID antenna 100 has been printed. In FIG. 6 another example of a graphene based conductive RFID antenna 100 is shown. Here, the RFID antenna 100 is not necessarily connected to a RFID chip, but one or more resonance circuits 120 are also printed close to the antenna 110. Preferably, also these resonance circuits 120 are printed by means of the printing unit 50 and using the same graphene based conductive substance. As each resonance circuit 120 will absorb energy, there will an energy loss at the resonance frequency in the antenna response. In the shown example having 16 resonance circuits, if all resonance circuits are unique there are $2^{16}$ combinations, which can be used for digital data representation.

The printed RFID antenna 100 will thereby form, or form part of, a RFID tag. Traditionally, RFID tags are constituted by two parts: the antenna 100 and the chip 110. The RFID antenna 100 is within the context of this specification a plane conductor formed by a graphene based material and having a specific shape. The chip 110 on the other hand is a small, such as in the range of 0.5 $mm^2$, integrated circuit connected to the antenna 100. By having the antenna 100 being printed directly on the packaging material 20, there is no need for additional production steps of manufacturing the RFID tags on a dedicated substrate that then needs to be applied on the final packaging material. The graphene-based conductive substance used for printing the RFID antenna 100 is preferably in the form of an ink, thereby allowing standard equipment to be used (such as ink jet technology). The graphene-based conductive substance comprises graphene or graphene oxide, in one or more layers. Preferably, the graphene-based conductive substance comprises a dispersion of flakes of graphene or graphene oxide, so that the graphene based substance can be printed and such that the resulting RFID antenna 100 is formed by a conductive distribution of the graphene based material.

The graphene based conductive ink also enables printing of the antenna 100 directly on the packaging material 20 in the converting unit 40, as described above. One advantage of using graphene based substance for printing is that the thickness of the antenna 100 can be greatly reduced compared to if metal inks were used. Further to this, graphene is superior for food safety compatibility.

In cases where the antenna 100 is to be connected to a RFID chip 110, the chip 110 is preferably applied and connected to the antenna 100 after printing.

The proposed printing technology also allows usage of a chip-less RFID, as suggested above with reference to FIG. 6. The antenna 100 is in such embodiment not connected to any chip, which thereby enables a faster and quicker production of the integrated RFID technology.

Several shapes can be printed close to the antenna 100 using the same graphene based conductive ink. These shapes act as resonators and they will be characterized by a capacitance, an inductance and a resonance frequency according to their geometry. By printing unique shapes thereby also brings about the possibility to print chip-less RFID tags with unique spectral signature. Thus, RFID identification of the packages (or packaging material) is possible without any integrated circuit on the packaging material but exploiting only the graphene based substance and the ability to print it directly on the packaging material.

In an embodiment, the chip-less RFID antenna 100 can be improved by adding a sensing function. Starting in the embodiment of FIG. 6, having several resonance circuits 120, the characteristic parameters of these resonance circuits can be configured to change according to some environmental variables. As one example, one of the resonance circuits 120 can be covered with a polymer ink that is configured to sublimate if the temperature of the packaging material 20 rises above 10° C. If this happens, the capacitance of the resonance circuit 120 will change and consequently also the resonance frequency. In other words, such approach is preferably used for cold chain monitoring of the packages 30.

Figure 7:
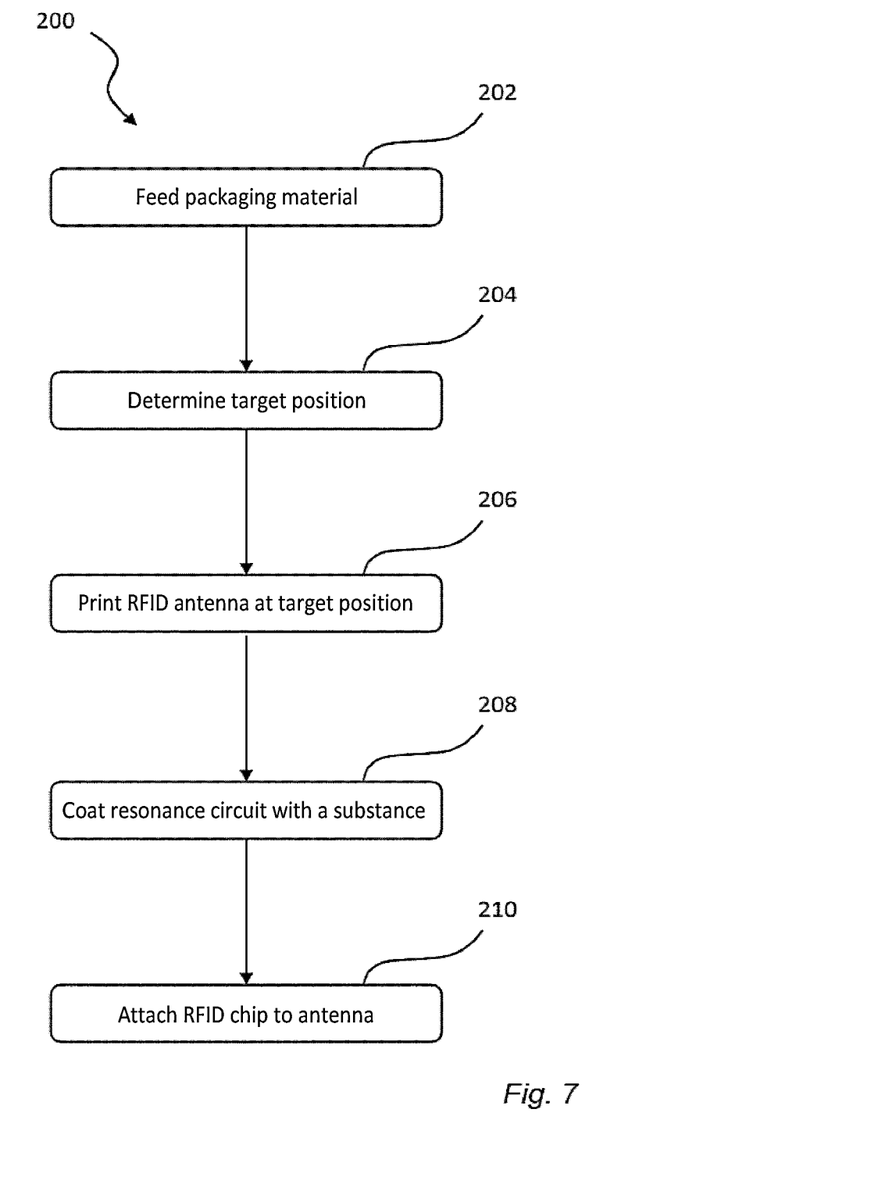
FIG. 7 is a schematic view of a method for providing a packaging material.

Now turning to FIG. 7, a method 200 for providing a packaging material 20 will be described. The method 200 comprises a first step 202 of feeding a web of packaging material 20 through a packaging material processing unit; a step 204 of determining a target position of said packaging material 20; and a step 206 of controlling the printing unit 50 to print the RFID antenna 100 at said target position, wherein the material used for printing the RFID antenna 100 is a graphene-based conductive substance.

The step 206 of controlling the printing unit 50 to print the RFID antenna 100 can also include the step 208 of printing one or more resonance circuits 120 adjacent to the antenna 100.

Optionally, the method 200 may comprise the step 208 of coating one or more resonance circuits 120 with a substance, which substance is configured to change the resonance frequency of the resonance circuit 120.

Also, the method 200 may optionally comprise a step 210 of attaching a RFID chip to the antenna 100.

From the description above follows that, although various embodiments of the invention have been described and shown, the invention is not restricted thereto, but may also be embodied in other ways within the scope of the subject-matter defined in the following claims.

The invention claimed is:

1. A method for providing a packaging material, comprising: feeding a web of packaging material through a packaging material processing unit; determining a target position of said packaging material; and controlling a printing unit to print an RFID antenna at said target position, wherein the material used for printing the RFID antenna is a conductive substance, wherein controlling a printing unit to print an RFID antenna at said target position further comprises printing one or more resonance circuits adjacent to said antenna; and coating individual resonance circuits with a substance, the substance configured to change the resonance frequency of the resonance circuit.

2. The method according to claim 1, wherein the conductive substance is a carbon-based substance.

3. The method according to claim 2, wherein the conductive substance is an ink.

4. The method according to claim 2, wherein the conductive substance comprises graphene or graphene oxide, in one or more layers.

5. The method according to claim 4, wherein the conductive substance comprises a dispersion of flakes of graphene or graphene oxide.

6. The packaging material according to claim 2, wherein the conductive substance is a graphene-based substance.

7. The method according to claim 1, wherein the packaging material processing unit is a packaging material converting unit or a packaging machine configured to form, fill, and seal package containers.

8. The method according to claim 1, further comprising attaching a RFID chip to said antenna.

9. The method according to claim 1, wherein the target position is determined in relation to one or more features of the packaging material.

10. The method according to claim 1, wherein the packaging material comprises a plurality of layers together forming a laminate configured to store liquid food content when the packaging material is formed into a package container, and wherein the RFID antenna is printed on one of said layers.

11. The method according to claim 10, wherein the RFID antenna is printed on the external layer of the packaging material.

12. The method according to claim 10, wherein the RFID antenna is embedded in the packaging material.

13. A packaging material comprising a plurality of layers together forming a laminate configured to store liquid food content when the packaging material is formed into a package container, wherein said packaging material comprises at least one RFID antenna being printed when a web of said packaging material is fed through a packaging material processing unit, and wherein said packaging material comprises one or more resonance circuits positioned adjacent to said RFID antenna, wherein individual resonance circuits are coated with a substance, the substance configured to change the resonance frequency of the resonance circuit.

14. The packaging material according to claim 13, wherein a target position of the RFID antenna is fixed in relation to one or more features of the packaging material.

15. The packaging material according to claim 13, wherein the resonance circuit is printed using a graphene-based conductive substance.

16. The packaging material according to claim 13, further comprising a RFID chip being connected to said RFID antenna.

17. The packaging material according to claim 13, wherein the RFID antenna is formed by a graphene-based conductive substance.

18. A package, formed by a packaging material according to claim 13.

* * * * *